United States Patent
Nagashima

[11] Patent Number: 6,018,939
[45] Date of Patent: Feb. 1, 2000

[54] HAND-HELD POWER WORKING MACHINE

[75] Inventor: Akira Nagashima, Kanagawa, Japan

[73] Assignee: Kioritz Corporation, Tokyo, Japan

[21] Appl. No.: 09/074,321

[22] Filed: May 7, 1998

[30] Foreign Application Priority Data

May 14, 1997 [JP] Japan .................................... 9-124140

[51] Int. Cl.[7] .................................................. A01D 55/00
[52] U.S. Cl. ................................. 56/237; 56/239; 56/289; 30/210
[58] Field of Search ............................. 56/237, 239, 289, 56/10.5; 30/210, 211, 231, 233, 216, 290, 296.1

[56] References Cited

U.S. PATENT DOCUMENTS

| | | | |
|---|---|---|---|
| D. 313,538 | 1/1991 | Fushiya et al. ............................. | D8/8 |
| D. 320,145 | 9/1991 | Clivio ....................................... | D8/8 |
| D. 323,770 | 2/1992 | Alsup et al. ............................... | D8/8 |
| D. 323,771 | 2/1992 | Alsup et al. ............................... | D8/8 |
| D. 333,953 | 3/1993 | Miyoshi et al. ........................... | D8/8 |
| D. 351,096 | 10/1994 | Gierke ..................................... | D8/8 |
| 3,422,531 | 1/1969 | Lill et al. ................................. | 30/221 |
| 4,449,062 | 5/1984 | Wilson ..................................... | 307/328 |
| 4,592,142 | 6/1986 | Schnizler ................................. | 30/210 |
| 4,856,195 | 8/1989 | Grossman et al. ........................ | 30/369 |
| 4,932,126 | 6/1990 | Pilatowicz et al. ....................... | 30/216 |
| 5,150,523 | 9/1992 | McCurry ................................... | 30/228 |
| 5,305,528 | 4/1994 | Garrison ................................... | 30/216 |
| 5,581,891 | 12/1996 | Wheeler et al. .......................... | 30/216 |
| 5,638,945 | 6/1997 | Fukinuki et al. ......................... | 200/43.17 |
| 5,689,887 | 11/1997 | Heywood et al. ......................... | 30/220 |
| 5,697,258 | 12/1997 | Aiyama ..................................... | 74/491 |
| 5,867,910 | 2/1999 | Stegall et al. ........................... | 30/272.1 |

*Primary Examiner*—Thomas B. Will
*Assistant Examiner*—Arpad Fabian Kovacs
*Attorney, Agent, or Firm*—Baker & Botts, L.L.P.

[57] ABSTRACT

A hand-held power working machine which makes it possible to enlarge the area of the front handle portion which is available for gripping, to enhance the rigidity of the hand protector, and to facilitate the mounting of the front handle and hand protector. This hand-held power working machine comprises a front handle portion and a hand protector, and is characterized in that the hand protector is constituted by a rear protector body having an inverted U-shaped cross-section formed with an upper plate and right and left side plates, and by a front protector body disposed in front of and extending outwardly from the rear protector body and forming a sectorial shape, and in that the front handle portion is integrally formed with the side plates of the rear protector body.

3 Claims, 5 Drawing Sheets

HAND-HELD POWER WORKING MACHINE

BACKGROUND OF THE INVENTION

This invention relates to a hand-held power working machine, and in particular to a front handle and a handle protector which are disposed at a forward portion of the hand-held power working machine such as a hedge trimmer.

A hand-held power working machine such as a hedge trimmer is generally constituted by a prime mover case having a prime mover such as an internal combustion engine, a mount base portion surrounding a transmission case having a power transmission device such as gears to be actuated by the prime mover, a working portion comprising clipper blades to be actuated via the aforementioned power transmission device by the prime mover, and a handling portion attached to the prime mover case, the transmission case or the mount base portion. This handling portion is constituted, for the convenience of manipulation thereof, by a front handle portion and a rear handle portion. The front handle portion is provided in front thereof with a hand protector for protecting an operator's hand holding the front handle portion, while the rear handle portion is provided with a throttle lever for adjusting the opening degree of a throttle valve of the internal combustion engine.

FIG. 5 illustrates perspective views of a front handle 14' and a hand protector 20' which are ordinarily mounted on a conventional hand-held power working machine such as a hedge trimmer. As shown in FIG. 5, the front handle portion 14' is loop-shaped, the upper portion 14a' and both side portions 14b' of which being utilized as a gripping portion, and the lower portion 14c' of which being utilized as a fastening portion to be fixed to a tip mounting portion 12a' of a mount base 12' extending forward of the power working machine.

The hand protector 20' is formed of a single plate which has been bent into a L-shape, the rear flat protector portion 20a' of which is integrally connected through its rear end with the front portion of the lower portion 14c' of the front handle portion 14', while the fore flat protector portion 20b' of which is extended upward and inclined forward.

A transmission case (not shown) having a power transmission portion for actuating the work portion 13' consisting of the clipper blade, etc. is disposed at the forward portion of the power working machine, i.e. at the central scooped-out portion 12b' of the mount base 12' and below the front handle portion 14' and hand protector 20'. This transmission case is fixed via an elastic rubber (not shown) to the mount base 12'.

In the trimming work of hedge using the hand-holding power working machine (such as a hedge trimmer) which is provided with the front handle 14' and the hand protector 20', the working portion 13' consisting of clipper blades etc. is actuated while gripping the upper portion 14a' or the side portions 14b' of the front handle portion 14' with an operator's hand. During this operation, the hand protector 20' functions to protect the hand gripping the front handle portion 14'.

Since the conventional hand protector 20' as explained above is constructed such that the rear flat protector portion 20a' and fore flat protector portion 20b' thereof are, just like a cantilever, secured to and extended from the lower portion 14c' of the front handle portion 14', the rear flat protector portion 20a' is not only formed of a thin flat plate so as to lighten the weight of the hand protector 20' as much as possible and to assure a sufficient rigidity for ensuring the function as a protector, but also dimensioned to have a width "L" which is almost the same as the length of the lower portion 14c' of the front handle portion 14' so as to assure a sufficient rigidity thereof.

Meantime, there has been recently proposed a hand-held power working machine wherein a rear handle portion is rotatably mounted on the main body of the working machine and adapted to be locked at any suitable rotational position so as to conform it to any working posture of the operator. In the case of the working machine of this kind, it is required to secure the gripping position of the front handle so as to conform to any rotated position of the rear handle, i.e. as much area as possible of the loop of the front handle portion is required to be made available for gripping.

However, since the rear flat protector portion 20a' of the hand protector 20' is integrally connected, via its full width "L", with the lower portion 14c' of the front handle portion 14' according to the aforementioned prior art, the lower portion 14c' of the front handle portion 14' cannot be made available for gripping the front handle portion 14', thus making it difficult to suitably conform to the changes in working posture of the operator.

Moreover, since the loop-shaped front handle portion 14' is integrally connected with the hand protector 20' formed of a thin plate, there is a problem that should be improved, i.e. the manner of attaching these integrated bodies to the mounting portion 12a' of the mount base 12'.

BRIEF SUMMARY OF THE INVENTION

This invention has been made to cope with the aforementioned problems, and therefore an object of the present invention is to provide a hand-held power working machine, which makes it possible to enlarge the area available for gripping the loop-shaped front handle portion provided integrally with a hand protector, to enhance the rigidity of the hand protector, and to facilitate the mounting of the front handle portion and the hand protector on the main body of the working machine.

With a view to obtaining the aforementioned object, this invention provides a hand-held power working machine comprising a front handle portion and a hand protector, which is characterized in that the hand protector is constituted by a rear protector body having a reverse U-shaped cross-section formed with an upper plate and right and left side plates, and by a front protector body disposed in front of the rear protector body and extending outward forming a sectorial shape, that the front handle portion is integrally formed with said side plates of the hand protector, that the front handle portion is shaped in a form of a loop consisting of a continuous integral body comprising an upper grip portion, right and left gripping portions, and lower right and left gripping portions, the front handle portion being disposed to surround an upper periphery of the rear protector body of the hand protector; and that the inner end portions of the lower right and left gripping portions are integrally formed with the side plates of the rear protecting body, respectively.

In a specific embodiment of this invention, the hand protector is provided at the back of the rear protector body with a mounting plate, which is adapted to be attached to a mount base, and also provided at the bottom of the rear protector body with a working portion-supporting body which is adapted to support the working portion via a buffer body.

In the operation of the hand-held power working machine provided with the front handle portion and the hand protector which are constructed according to this invention, the rotatable rear handle portion is locked after setting it to a desired rotational position, and then any desired portion of the front handle portion selected from the upper gripping portion, the right and left gripping portions, and the lower right and left gripping portions is gripped so as to perform a work in an optimum gripping condition.

Since even the lower right and left gripping portions of the front handle portion is made available according to this invention, the gripping area of the front handle portion is enlarged, so that the front handle portion can be gripped at an optimum area thereof in conformity with changes in working posture of an operator.

Further, since the lower right and left gripping portions of the front handle portion are to be gripped by inserting an operator's hand in a space between the right and left side plates of the rear protector body of the hand protector and the right and left side gripping portions of the front handle portion, the operator's hand can be protected by the side gripping portions and the side plates, thus enhancing the safety of the operator.

Furthermore, since the rear protector body of the hand protector is reverse U-shaped in cross-section, the rigidity of the rear protector can be assured even if the thickness of the rear protector body is fairly thinned, so that the weight of the hand protector can be greatly reduced.

DETAILED DESCRIPTION OF THE INVENTION

A hedge trimmer provided with a front handle portion and a hand protector, which represents one embodiment of a hand-held power working machine according to this invention, will be explained with reference to the drawings.

Figure 1:
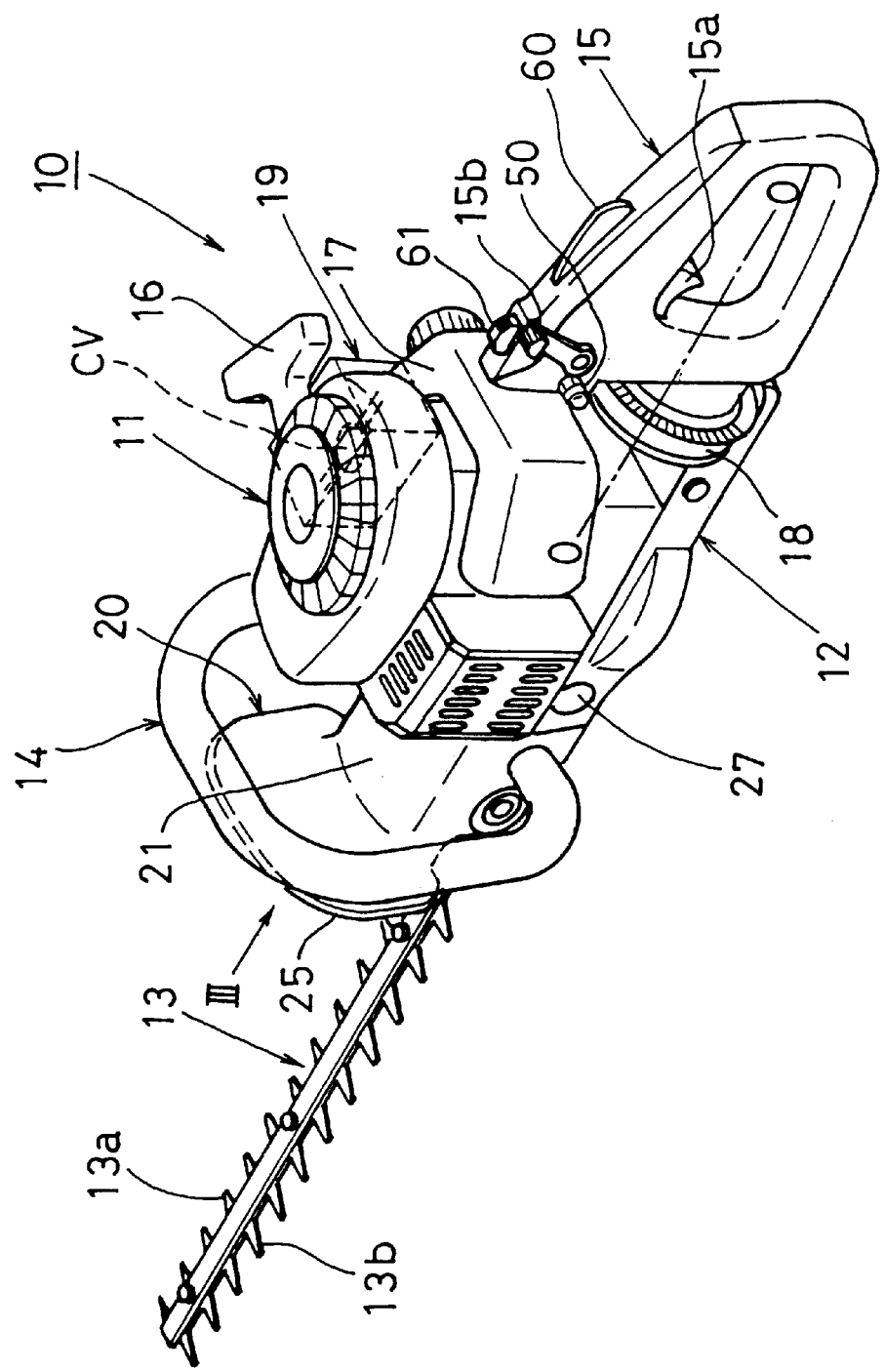
FIG. 1 is a perspective view illustrating a hedge trimmer representing one embodiment of a hand-held power working machine according to this invention.
Figure 4:
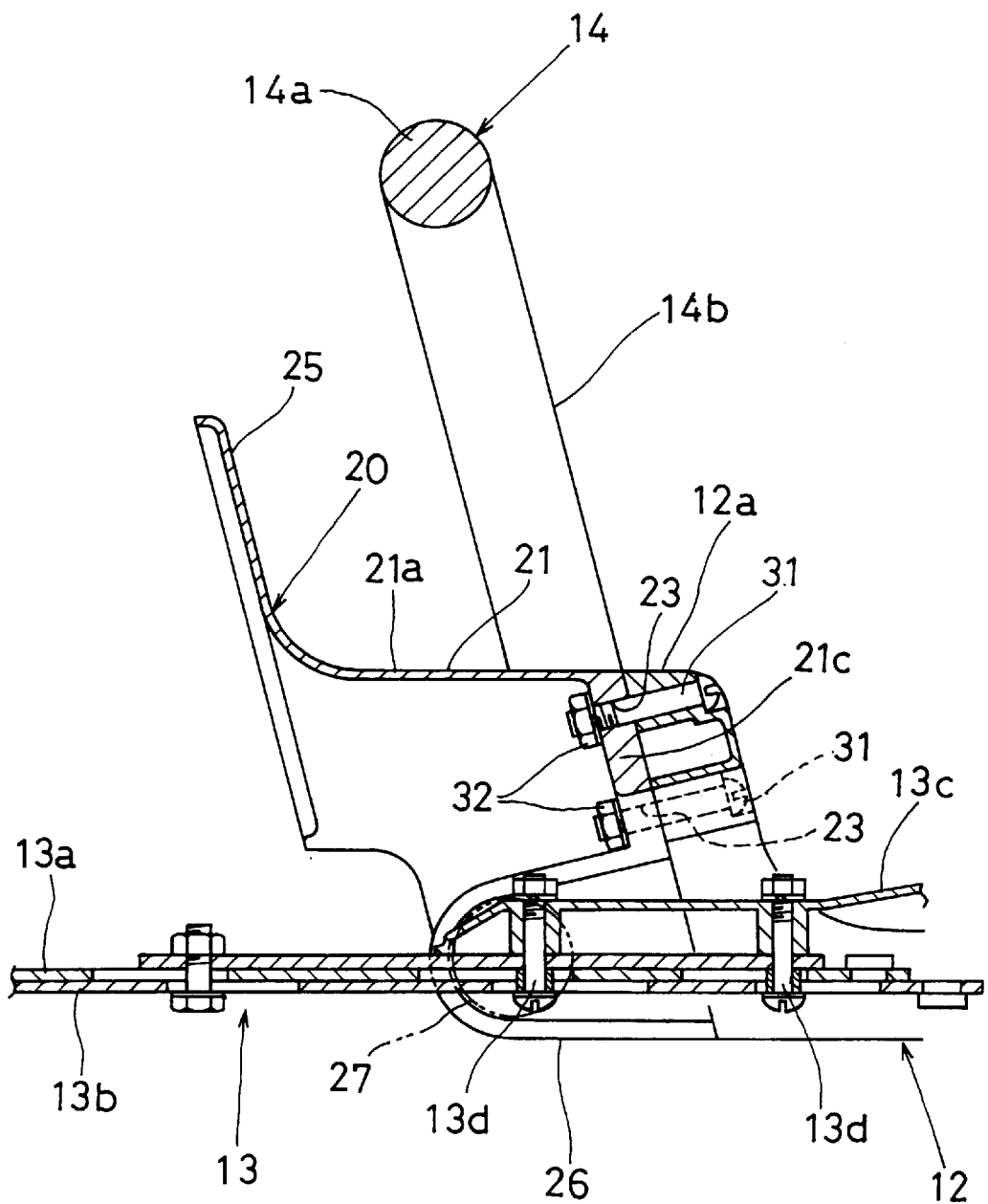
FIG. 4 is a cross-sectional view of the hedge trimmer taken along the line IV—IV of FIG. 3.
Figure 5:
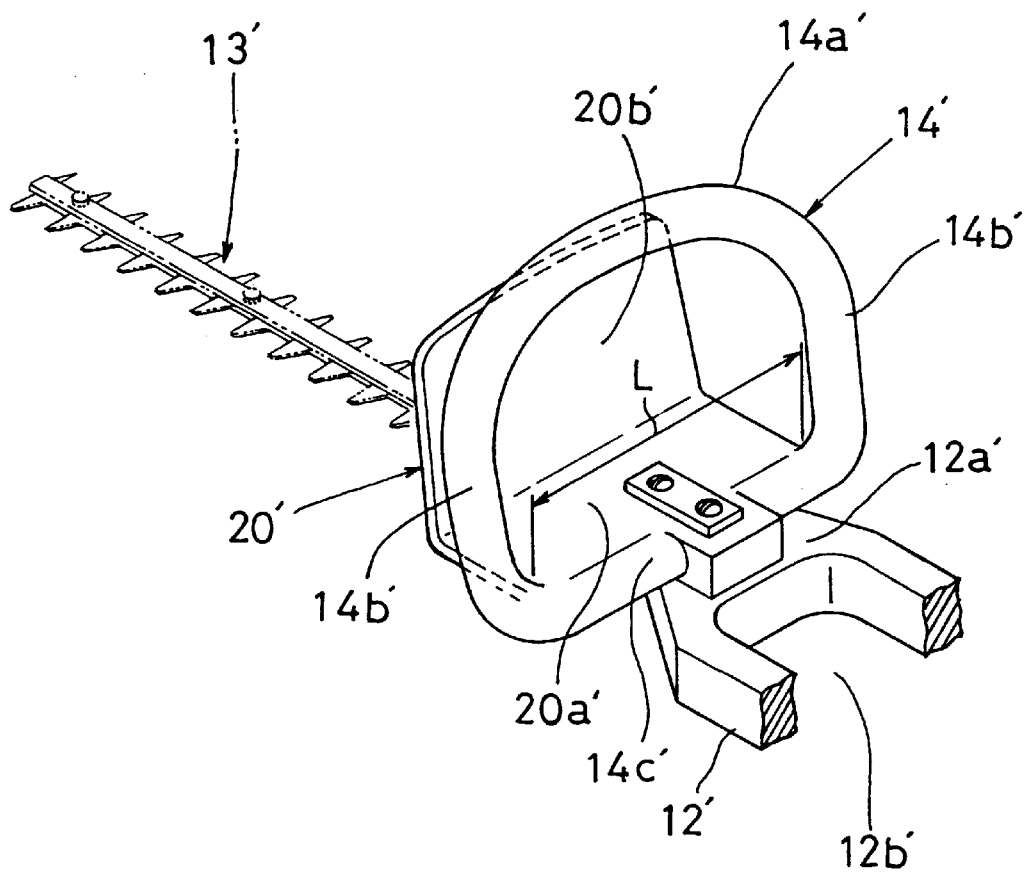
FIG. 5 is a perspective view schematically illustrating the front handle portion and hand protector of a conventional hand-held power working machine.

FIG. 1 shows a perspective view illustrating one embodiment of a hedge trimmer 10 provided with a front handle portion and a hand protector according to this embodiment. The hedge trimmer 10 comprises an air-cooled two-stroke gasoline internal combustion engine 11, a mount base portion 12 enclosing a transmission case 13c (FIG. 4) having a power transmission device (not shown) such as gears to be actuated by the internal combustion engine 11, a working portion 13 composed of a pair of upper and lower clipper blades 13a and 13b which are to be actuated via the aforementioned power transmission device by the internal combustion engine 11, a loop-shaped front handle portion 14 mounted on a forward portion of the mount base 12, a hand protector 20 integrally attached to the vicinity of the front handle portion 14, and a rear handle portion 15 mounted on a rearward portion of the mount base 12.

A recoil starter 16 and a fuel tank 17 are attached to the internal combustion engine 11 in which a carburetor 19 having a throttle valve CV and an ignition plug (not shown) are installed. The pair of upper and lower clipper blades 13a and 13b constituting the working portion 13 are designed to be reciprocatingly driven relative to each other by means of the internal combustion engine 11 via the power transmission device such as a reciprocative motion device which is disposed in the transmission case 13c. The rear handle portion 15 is mounted on the mount base 12 in such a manner that it is pivotally rotated about an axial line O—O, and that it can be locked at any rotated position. A main lever (e.g. throttle lever) 15a and a sub-lever (e.g. sub-throttle lever) 15b are attached to the rear handle portion 15.

Figure 2:
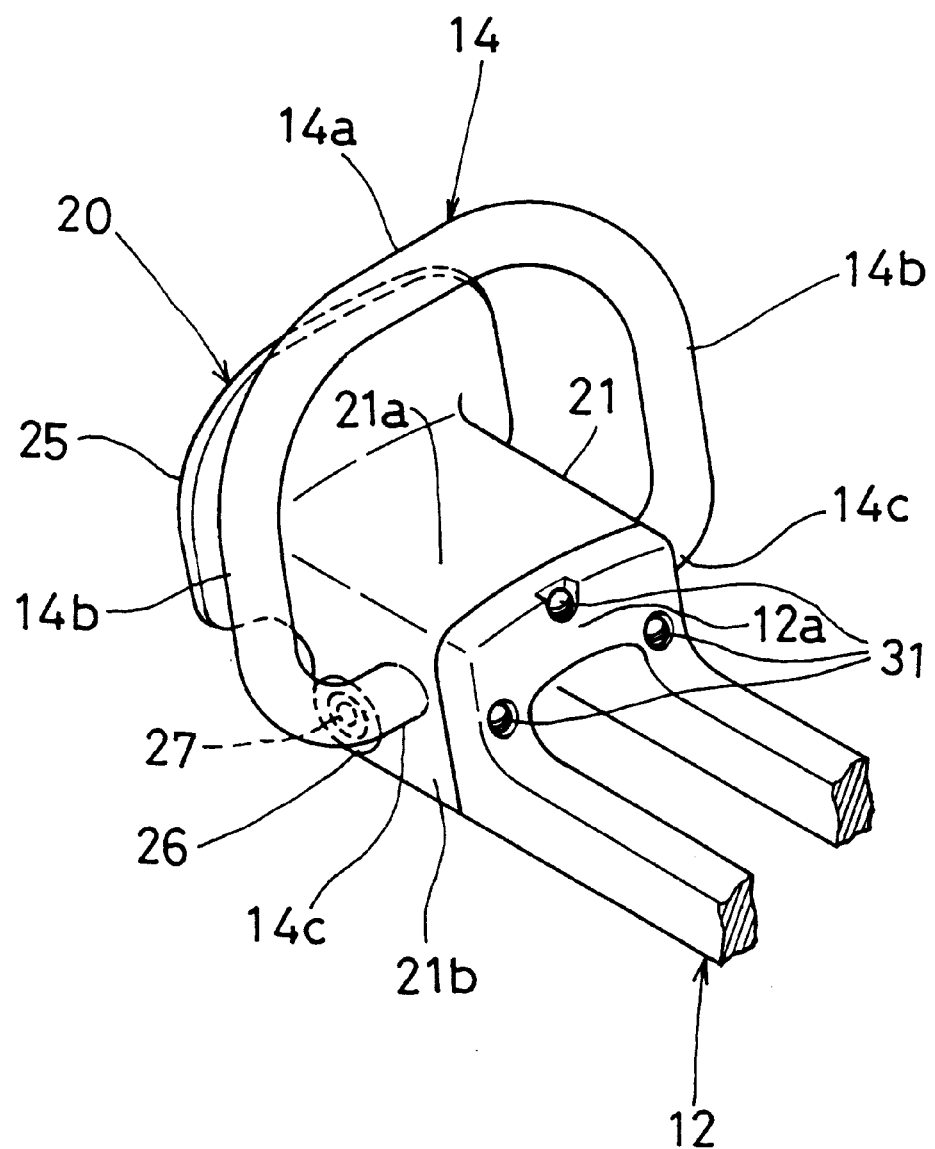
FIG. 2 is a perspective view schematically illustrating the front handle portion and hand protector of the hedge trimmer shown in FIG. 1.

As shown in FIG. 2, the front portion 12a of the mount base 12 is formed into a reverse U-shape, and the hand protector 20 is secured to the front face of the reverse U-shaped front portion 12a. The hand protector 20 is constituted by a rear protector body 21 having a reverse U-shaped cross-section, and by a front protector body 25 disposed in front of the rear protector body 21 and extending radially (also slightly inclined forward) from the reverse U-shaped periphery, thus forming a sectorial shape.

The rear protector body 21 is provided with an upper plate 21a and with right and left side plates 21b. A portion of the rear protector body 21 which is to be contacted with the reverse U-shaped front portion 12a of the mount base 12 is formed into a mounting plate 21c. The upper plate 21a and the right and left side plates 21b are constituted by a sheet of thin plate which has been continuously curved in a semicylindrical shape. The mount base 12 is provided with three bolt-inserting holes 23 which are spaced apart from each other. A clamping bolt 31 is inserted into each of the bolt-inserting holes 23 from the reverse U-shaped front portion 12a of the mount base 12, and then the hand protector 20 is clamped to the mount base 12 by fastening the clamping bolt with a locknut 32.

The front handle portion 14 is shaped in the form of a loop consisting of an continuous integral body comprising an upper grip portion 14a, right and left gripping portions 14b, and lower right and left gripping portions 14c, and is disposed to surround an upper periphery of the rear protector body 21 of the hand protector 20. The front handle portion 14 is integrally fixed to the rear protector body 21 at the inner end portions of the lower right and left gripping portions 14c to the side plates 21b of the rear protecting body 21, respectively.

A pair of working portion-supporting members 26 are integrally formed at the bottoms of the right and left side plates 21b of the rear protector body 21, and are provided respectively with a through-hole 28 for allowing a stud bolt 12d to be inserted therein through a buffer body 27 formed of rubber, etc.

Figure 3:
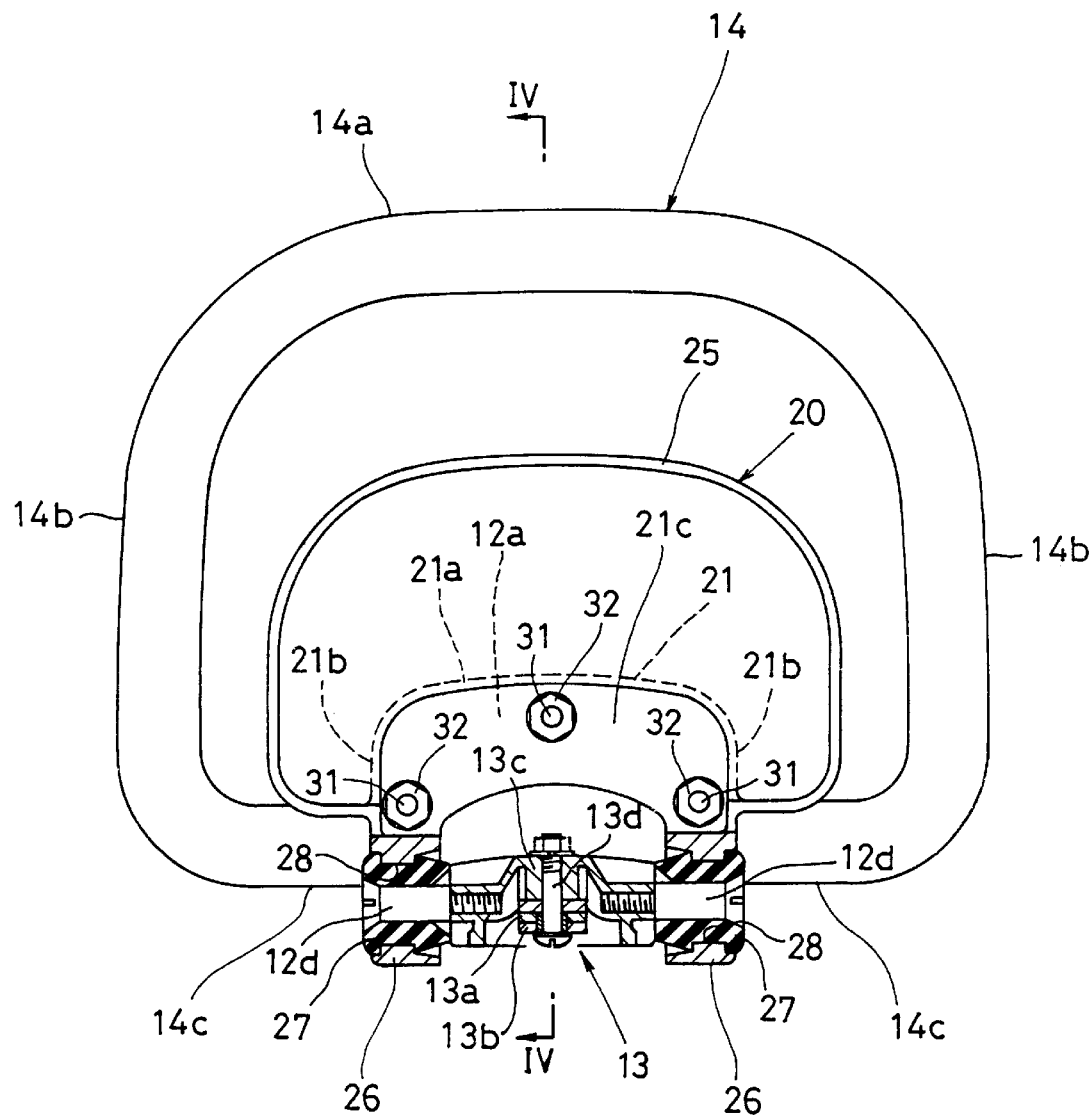
FIG. 3 is a partially sectioned view of the hedge trimmer shown in FIG. 1 as it is viewed in the direction of the arrow III.

As seen from FIG. 3, the working portion 13 comprising the clipper blades 13a and 13b is interposed between a pair of the right and left working portion-supporting members 26, and supported by means of supporting bolts 13d by the transmission case 13c enclosed by the mount base 12 in such a manner that the working portion 13 can be reciprocatingly moved back and forth.

The operation of the hedge trimmer 10 constructed according to this embodiment is as follows.

The internal combustion engine 11 can be started by manipulating the recoil starter 16 of the hedge trimmer 10. However, since the internal combustion engine 11 is in a state of idling under this condition, the engine speed is still low so that the centrifugal clutch (not shown) disposed at the power input side of the power transmission device for the working portion 13 cannot be put into a state of clutch-in, and hence the driving power of the engine 11 cannot be transmitted to the clipper blades 13a and 13b, i.e. the reciprocating motion of the clipper blades 13a and 13b would not take place.

Then, the throttle lever 15a and the sub-throttle lever 15b are manipulated while gripping the rear handle portion 15 and the front handle portion 14 with both hands so as to increase the output of the engine 11 (i.e. engine speed). As a result, the centrifugal clutch is brought into a state of clutch-in, and the clipper blades 13a and 13b are allowed to reciprocatingly move in opposite direction to each other with a phase shift of 180 degree, thus making it possible to carry out the cutting work of a hedge.

During the clipping work of a hedge, the hand gripping the front handle portion 14 can be protected from the clipper blades 13a and 13b as well as from the matters (hedge) to be cut due to the front protector body 25 and rear protector body 21 of the hand protector 20.

In the ordinary clipping work, the upper gripping portion 14a of the front handle portion 14 is held by an operator's hand. However, when the operator desires to change the working posture for some reason, the rear handle portion 15 is rotated to change the locking position of the rear handle portion 15. Then, this re-positioned rear handle 15 is gripped and at the same time, the gripping position of the front handle portion 14 is also changed suitably to any of the right and left side gripping portion 14b, or the lower right and left gripping portion 14c, thus making it possible to perform the work under an optimum gripping condition.

Since the lower gripping portions 14c of the front handle portion 14 are made available for gripping with an operator's hand according to the front handle portion 14 of this embodiment, it is possible to enlarge the area available for gripping of the front handle portion 14, so that the front handle portion 14 can be gripped at an optimum position in conformity with changes in working posture of an operator.

Further, since the lower gripping portions 14c of the front handle portion 14 are to be gripped by inserting an operator's hand in a space between the side plates 21b of the rear protector body 21 of the hand protector 20 and the side gripping portions 14b of the front handle portion 14 according to the structure of the front handle portion 14 of this embodiment, the operator's hand can be protected by the side gripping portions 14b and the side plates 21b, thus enhancing the safety of the operator.

Furthermore, since the rear protector body 21 of the hand protector 20 is reverse U-shaped in cross-section, the rigidity of the rear protector can be assured even if the thickness of the rear protector body 21 is fairly thinned, so that the weight of the hand protector 20 can be greatly reduced.

Furthermore, the front handle portion 14 and the hand protector 20 are constructed such that they can be integrally molded, and at the same time, as the result of it, integral body of the front handle portion 14 and the hand protector 20 can be easily secured to the mount base 12 by means of clamping bolts 31. Therefore, the assembling and disassembling of the front handle portion 14 and the hand protector 20 can be easily performed, thus making it possible to reduce the manufacturing cost and to easily perform the repairing of them.

In the foregoing explanation, the present invention has been explained with reference to one embodiment. However, the present invention should not be construed to be limited by this embodiment, but may be variously modified within the spirit of the invention claimed in the appended claims.

As seen from the foregoing explanations, since the rear protector body of the hand protector is reverse U-shaped in cross-section by making use of an upper plate and side plates, and at the same time, the inner end portions of the lower gripping portions of the loop-shaped front handle are integrally formed with the right and left side plates of the rear protecting body respectively, the area of the front handle portion which is available for gripping can be enlarged, and at the same time, the weight of the hand protector can be reduced while ensuring the rigidity thereof.

I claim:

1. A hand-held power working machine comprising a working portion, a front handle portion and a hand protector, which is characterized in that the hand protector is constituted by a rear protector body having an inverted U-shaped cross-section formed with an upper plate and right and left side plates, and by a front protector body disposed in front of and extending outwardly from the rear protector body and forming a sectorial shape, in that the front handle portion is integrally formed with said side plates of the rear protector body, and in that said hand protector further includes a working-portion supporting body provided at the bottom of the rear protector body, said working-portion supporting body supporting said working portion, and a buffer body being interposed between said working-portion supporting body and said working-portion.

2. The hand-held power working machine according to claim 1, wherein said front handle portion is shaped in the form of a loop consisting of a continuous integral body, the continuous integral body having an upper grip portion, side right and left gripping portions, and lower right and left gripping portions; wherein the front handle portion is disposed to surround an upper periphery of the rear protector body of the hand protector; and wherein the ends of the lower right and left gripping portions are integrally formed with the right and left side plates of the rear protector body, respectively.

3. The hand-held power working machine according to claim 1, and further comprising a mount base disposed in a location behind the rear protector body, and wherein said hand protector further includes a mounting plate provided at the back of the rear protector body and attached to said mount base.

* * * * *